United States Patent [19]

Anno et al.

[11] Patent Number: 4,674,996
[45] Date of Patent: Jun. 23, 1987

[54] TENSIONER DEVICE FOR WRAPPING CONNECTOR DRIVING DEVICE IN INTERNAL COMBUSTION ENGINE

[75] Inventors: Nobuo Anno, Urawa; Itsuo Iwai, Shinminato; Takashi Kamezaki, Tokyo, all of Japan

[73] Assignees: Honda Giken Kogyo Kabushiki Kaisha, Tokyo; Tanaka Machine Industries Co., Ltd., Toyama, both of Japan

[21] Appl. No.: 840,830

[22] Filed: Mar. 18, 1986

[30] Foreign Application Priority Data

Mar. 19, 1985 [JP] Japan .................................. 60-54772
Mar. 19, 1985 [JP] Japan .................................. 60-54776

[51] Int. Cl.$^4$ ............................................. F16H 7/12
[52] U.S. Cl. .................................... 474/110; 474/104; 474/118; 474/133
[58] Field of Search ............... 474/110, 117, 118, 133, 474/135, 136, 138, 139, 148, 104; 180/231; 188/83, 314; 251/48; 248/562, 565; 267/8 R, 136, 137

[56] References Cited

U.S. PATENT DOCUMENTS

| | | | |
|---|---|---|---|
| 2,893,255 | 7/1959 | Bayliss | 188/314 |
| 3,142,193 | 11/1961 | Polko et al. | 474/110 |
| 4,094,205 | 4/1977 | Cook | 474/110 |
| 4,190,025 | 2/1980 | Wahl | 474/110 |
| 4,277,240 | 8/1979 | Kraft | 474/110 |
| 4,283,181 | 7/1979 | Sproul | 474/110 |
| 4,283,182 | 8/1979 | Kraft | 474/110 |
| 4,284,178 | 8/1981 | Tomita et al. | 188/314 |
| 4,411,638 | 10/1983 | Wilson | 474/138 |
| 4,464,146 | 5/1982 | Arthur | 474/133 |

FOREIGN PATENT DOCUMENTS

| | | | |
|---|---|---|---|
| 0035851 | 4/1981 | Japan | 474/110 |
| 0157397 | 7/1978 | Netherlands | 474/110 |
| 2065265 | 6/1981 | United Kingdom | 474/110 |

Primary Examiner—Stephen J. Novosad
Assistant Examiner—Bruce M. Kisliuk
Attorney, Agent, or Firm—Armstrong, Nikaido, Marmelstein & Kubovcik

[57] ABSTRACT

A tensioner device for applying a predetermined tension force to a transmission belt extended between a driving wheel and a driven wheel supported on the body of an internal combustion engine, including a hydraulic automatic adjuster which comprises a plunger case fitted in a cylinder bore through a seal member and a plunger slidably and axially movably fitted in the plunger case, open edges of the plunger case and plunger being sealed from outside by means of a flexible boot. An extra feed oil chamber formed within the plunger is in communication with a feed oil source by means of a closed oil path through a feed oil port and in communication with an oil reservoir by means of another closed oil path through an oil discharge port provided in a spaced relation from the feed oil port. A high pressure oil chamber is provided below the plunger, and high pressure oil within the high pressure oil chamber may leak into the extra oil chamber through a sliding clearance provided between sliding surfaces of the plunger and the plunger case. The plunger has an open end formed as an oil injection port which allows injection of oil to the high pressure oil chamber, the injection oil port being oil-tightly sealed from outside by means of a cap.

13 Claims, 9 Drawing Figures

TENSIONER DEVICE FOR WRAPPING CONNECTOR DRIVING DEVICE IN INTERNAL COMBUSTION ENGINE

BACKGROUND OF THE INVENTION

1. Field of the Invention

The present invention relates to a tensioner device for a wrapping connector driving device in an internal combustion engine for automatically applying a given tension force to an endless transmission belt extended between a driving wheel and a driven wheel supported on an engine body.

2. Description of the Prior Art

An internal combustion engine has been well known in which an endless transmission belt is extended between a driving wheel and a driven wheel, and an automatic adjuster is connected to a tensioner body pressed against the transmission belt to thereby always apply a given tensioer force to the transmission belt (Japanese Utility Model Application Laid-Open No. 202039/82).

In the above-described conventional tensioner device, a feed oil chamber of a hydraulic automatic adjuster is open to outside, and when it is operated, oil tends to partly leak outside. Therefore, if a belt type wrapping connector driving device is employed, there arises a problem that leaked oil may adhere to the transmission belt, resulting in an increase in slip of the transmission belt to deteriorate the transmission efficiency and quicken the deterioration of the transmission belt.

In order to overcome these inconveniences as noted above, the aforesaid hydraulic automatic adjuster has to be designed oil-tightly, and if a seal member such as an O-ring is provided at sliding parts between the cylinder and piston of the automatic adjuster, there poses problems that the relative sliding resistance thereof may be increased and the seal member may quickly be worn out and also that the sealing effect may become insufficient.

Furthermore, if a seal member is used as a seal between the cylinder and piston of the automatic adjuster, it is difficult to absorb a tension shock and a surplus tension force applied to the transmission belt during the operation of an internal combustion engine, giving rise to problems that the durability of the transmission belt may be affected disadvantageously, and the transmission efficiency may further be deteriorated.

SUMMARY OF THE INVENTION

The present invention has been achieved in view of the above-described circumstances, and it is an object of the invention to provide a tensioner device for a wrapping connector driving device in an internal combustion engine in which a seal member is not provided between sliding portions of an automatic adjuster to enhance the operating efficiency of the automatic adjuster and enhance the sealing performance, and in which filling of oil into a high pressure oil chamber of the automatic adjuster is facilitated to reduce the manufacturing cost of a plunger itself.

For achieving the above-described object, according to a first aspect of the present invention, there is provided a tensioner device for a wrapping connector driving device in an internal combustion engine in which an endless transmission belt in extended between a driving wheel and a driven wheel supported on an engine body, and a tensioner is pressed against the transmission belt on a loosening side thereof to apply a predetermined tension force to the transmission belt, wherein said tensioner device has a hydraulic automatic adjuster comprising a plunger case provided on the engine body, a plunger slidably fitted in said plunger case and connected to the tensioner, a high pressure oil chamber defined below said plunger, an extra feed oil chamber provided internally of said plunger and communicated with said high pressure oil chamber through a valve port bored in a bottom wall of said plunger, a check valve encased in said high pressure oil chamber to close said valve port when pressure in said high pressure oil chamber increases and to open the valve port when pressure in that chamber decreases, and a tension spring encased in said high pressure oil chamber to bias said plunger in an extending direction to apply a predetermined tension force to said transmission belt on the loosening side thereof via the tensioner, wherein said plunger case is bored with a feed oil port and an oil discharge port in a spaced relation, said feed oil port being communicated with said extra oil chamber, said oil discharge port being communicated with an upper portion of said extra oil chamber through a leak oil chamber formed between said plunger case and said plunger, an outer open end between said plunger case and said plunger being sealed by means of a flexible boot.

With the above-described arrangement, due to the provision of a flexible boot, even if pressure oil flows through the automatic adjuster, oil within the adjuster may not leak outside and the automatic adjuster may be operated without wastefully consuming the pressure oil to enhance the operating efficiency. In addition, there is no fear that oil is adhered to the wrapping connector driving device. Particularly, the transmission efficiency may be greatly enhanced when a belt type wrapping connector driving device is employed.

Since no seal member is interposed between the sliding surfaces of the plunger case and the plunger, the sliding resistance of the plunger is reduced to ensure a smooth and light operation. Further, since the outer open end between the plunger case and the plunger is sealed by a boot having no sliding portion, the boot can be free from wear and damage, thus enabling the desired sealing performance to be achieved for a long period of time.

According to a second aspect, the invention provides a tensioner device for a wrapping connector driving device in an internal combustion engine in which an endless transmission belt is extended between a driving wheel and a driven wheel supported on an engine body, and a tensioner is pressed against the transmission belt on a loosening side thereof to appy a predetermined tension force to the transmission belt, wherein said tensioner device has a hydraulic automatic adjuster comprising a plunger case provided on the engine body, a plunger slidably fitted in said plunger case, a high pressure oil chamber defined below said plunger, an extra feed oil chamber provided internally of said plunger to communicate with said high pressure oil chamber through a valve port bored in a bottom wall of said plunger, a check valve encased in said high pressure oil chamber to close said valve port when pressure in said high pressure oil chamber increases and to open said valve port when pressure in said oil chamber decreases, and a tension spring encased in said high pressure oil chamber to bias said plunger in an extending direction to apply a predetermined tension force to said transmission belt on the loosening side thereof, wherein said extra oil chamber is brought into communication with a feed oil source through a feed oil port, said plunger having an oil injection port opened to an upper end thereof for communicating said extra oil chamber with outside, said oil injection port being oil-tightly fitted with a cap which is operatively connected to said tensioner.

With this, in injecting oil into the high pressure oil chamber of the automatic adjuster, oil may be easily injected and filled from the oil injection port at the upper end of the plunger into the high pressure oil chamber in a state with the plunger having been incorporated in the plunger case. Thus, installation, maintenance and the like work of the plunger may be facilitated.

Furthermore, since the plunger is operatively connected to the tensioner through the cap, the plunger need not be formed with a connecting surface which requires a hardening treatment, thus enabling reduction of the manufacturing cost.

According to a third aspect, the invention provides a tensioner device for a wrapping connection driving device in an internal combustion engine in which an endless transmission belt is extended between a driving wheel and a driven wheel supported on an engine body, and a tensioner is pressed against the transmission belt on a loosening side thereof to apply a predetermined tension force to the transmission belt, wherein said tensioner device has a hydraulic automatic adjuster comprising a cylinder bore formed in a casing provided on said engine body, a plunger case fitted in said cylinder bore, a plunger slidably fitted in said plunger case, a high pressure oil chamber defined below the plunger, an extra feed oil chamber provided within said plunger to communicate with said high pressure oil chamber through a valve port bored in a bottom wall of said plunger, a check valve encased in said high pressure oil chamber to close said valve port when pressure in said high pressure oil chamber increases and to open the valve port when pressure in said oil chamber decreases, and a tension spring encased in said high pressure oil chamber to bias said plunger in an extending direction to apply a predetermined tension force to said transmission belt on the loosening side thereof through said tensioner, wherein said extra oil chamber is communicated via a feed oil port and an oil discharge port with a feed oil source and an oil reservoir, respectively, through respective closed oil paths, a seal member being provided to oil-tightly seal between an open end of said cylinder bore and said plunger case, and a flexible boot being provided to oil-tightly seal between an open end of said plunger case and an outer end of said plunger.

With this arrangement, in addition to the above-described advantages, oil leakage from the interior of the extra oil chamber may be immediately supplemented by oil supply from the feed oil source, and any air trapped within the extra oil chamber may be discharged outside easily.

According to a fourth aspect, the invention provides a tensiner device for a wrapping connector driving device in an internal combustion engine in which an endless transmission belt is extended between a driving wheel and a driven wheel supported on an engine body, and a tensioner is pressed against the transmission belt on a loosening side thereof to apply a predetermined tension force to the transmission belt, wherein said tensioer device has a hydraulic automatic adjuster comprising a plunger case provided on the engine body, a plunger slidably fitted in said plunger case and connected to said tensioner, a high pressure oil chamber defined below said plunger, an extra feed oil chamber formed within said plunger, a check valve encased in said high pressure oil chamber and capable of allowing flow of pressure oil only in a direction from said extra oil chamber to said high pressure oil chamber, and a tension spring encased in said high pressure oil chamber to bias said plunger in an extending direction to press said tensioner against said transmission belt, wherein a sliding clearance is formed between sliding surfaces of said plunger case and said plunger for allowing leakage of high pressure oil within said high pressure oil chamber into said extra oil chamber, and said plunger is formed with a feed oil port leading to a pressure oil source and an oil discharge port leading to an oil reservoir.

With this arrangement, in the case where an excessively large tension load or shock is applied to the transmission belt, such load or shock may be absorbed by a slight depression of the automatic adjuster, to enhance the durability of the transmission belt by preventing undue force from being applied to the belt and render possible a quiet, smooth and light operation of the wrapping connector driving device. Moreover, pressure oil may be immediately supplied to the high pressure oil chamber despite possession of the absorbing action for the excessively large load and shock, and an excellent responsiveness with respect to the elongation of the transmission belt may be achieved to apply a predetermined tension force to the transmission belt, this enhancing the transmission efficiency of the wrapping connector driving device.

The above and other object, features and advantages of the present invention will be apparent from the ensuing description of preferred embodiments which will be explained in detail with reference to the accompanying drawings.

BRIEF DESCRIPTION OF THE DRAWINGS

FIG. 1 is a front view of a timing wrapping connector driving device equipped with a device of the present invention for the internal combustion engine;

FIG. 2 is a side view as viewed from line II of FIG. 1;

FIG. 3 is an enlarged sectional view taken on line III—III of FIG. 1;

FIG. 4 is the reverse view of a pump case taken on line IV—IV of FIG. 2;

FIG. 5 is an enlarged sectional view taken on line V—V of FIG. 2;

FIG. 6 is a sectioal view of an adjuster case taken on line VI—VI of FIG. 5;

FIG. 7 is a sectional view showing the state where oil is supplied into a high pressure oil chamber;

FIG. 8 is a front view showing a part of a pump case; and

FIG. 9 is a sectional view taken on line IX—IX of FIG. 8.

DESCRIPTION OF THE PREFERRED EMBODIMENTS

A first embodiment of the present invention will be described hereinafter in which the device according to the present invention is applied to a DOHC type 4-cycle internal combustion engine.

Figure 1:
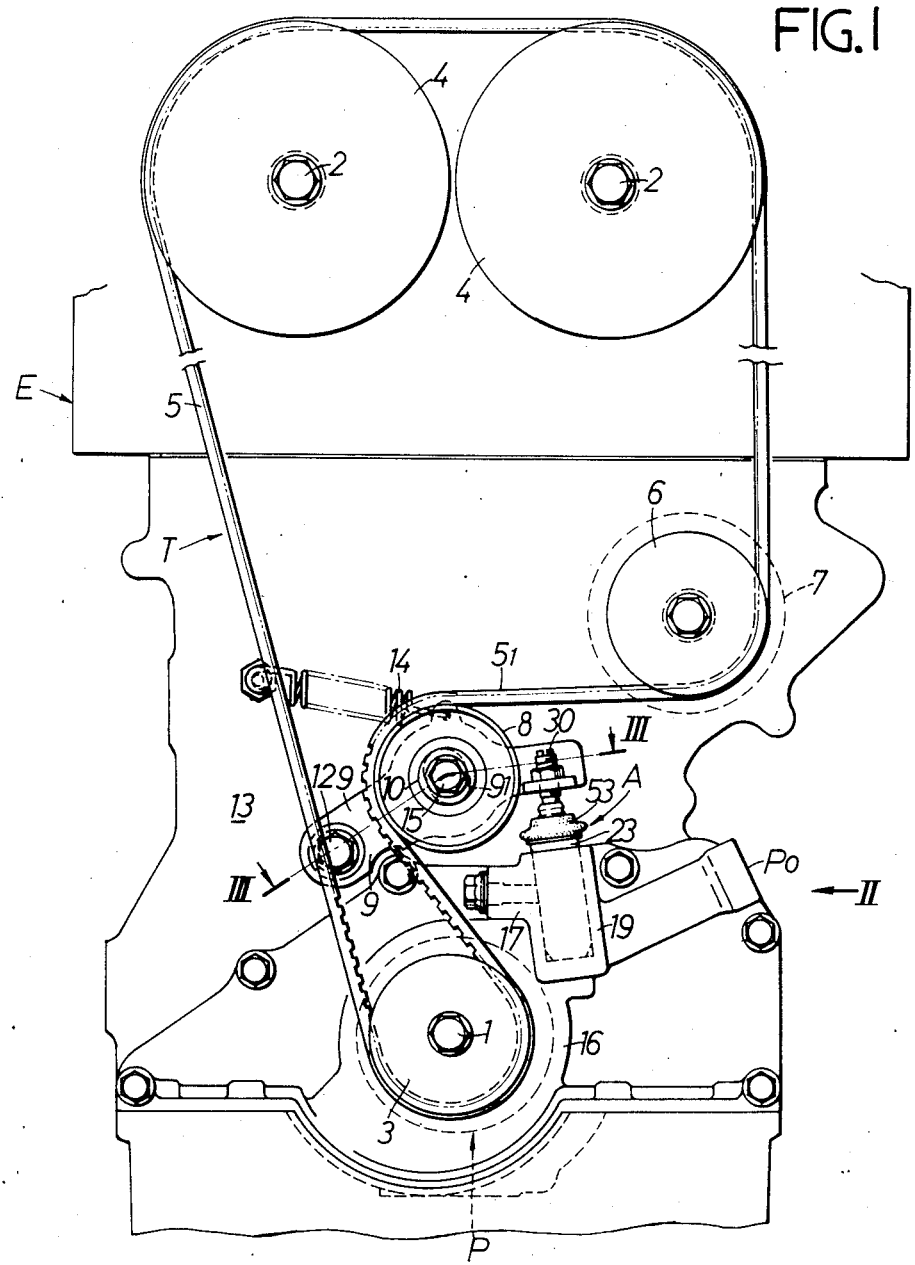
FIGS. 1 to 7 show a first embodiment of the device according to the present invention.

Referring first to FIG. 1, a timing wrapping connector driving device T for operatively connecting a crank shaft 1 and a pair of valve-operating cam shafts 2 is provided on one end surface of the engine body E of the internal combustion engine. This driving device T is designed so that an endless transmission belt 5 as a transmission belt is extended between a driving pulley 3 as a driving wheel secured to the crank shaft 1 and drive pulleys 4 as driven wheels respectively secured to the pair of valve-operating cam shafts 2. The other driven pulley 6 is extended halfway of the transmission belt 5, and a cooling water pump 7 for the engine body E is driven by this driven pulley 6.

Figure 2:
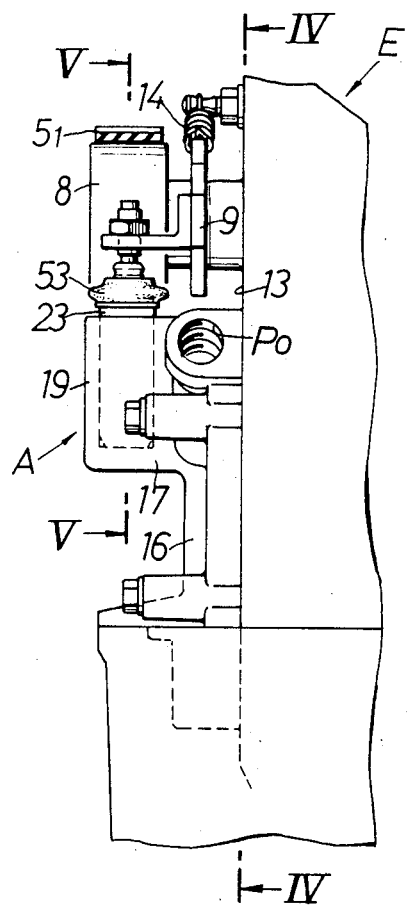
Figure 3:
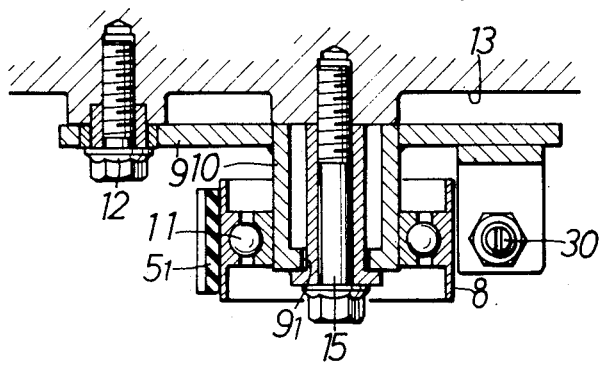

In FIGS. 1 to 3, between the driving pulley 3 and the other driven pulley 6, a tensioner pulley 8 as a tensioner is disposed externally of a loosening side $5_1$ of the transmission belt 5, the tension pulley 8 being rotatably supported through a ball bearing 11 on a pulley shaft 10 projected in an intermediate portion of an oscillating lever 9. A base end of the oscillating lever 9 is pivoted swingably up and down on an end wall 13 of the engine body E by means of a support shaft 12, and a slot $9_1$ formed in the intermediate portion of lever 9. The slot $9_1$ is elongated in the pivoting direction of the lever 9 as shown by the dotted line in FIG. 1. Thus, the slot 9 is loosely fitted in a guide shaft 15. A hydraulic automatic adjuster A for the transmission belt 5, which will be hereinafter described in detail, is connected to the foremost end of the oscillating lever 9. The tension pulley 8 is pressed against the transmission belt 5 by means of a pressing force of the automatic adjuster A to apply a given tension force to the belt 5.

The other end of a tension spring 14, a base end of which is tied to the end wall 13 of the engine body E, is connected to the upper portion in the intermediate position of the oscillating lever 9, and the tension force of the spring 14 acts so that the oscillating lever 9 may be turned counterclockwise about the support shaft 12 whereby the tension pulley 8 is pressed against the external surface of the transmission belt 5 on the loosening side $5_1$.

Figure 4:
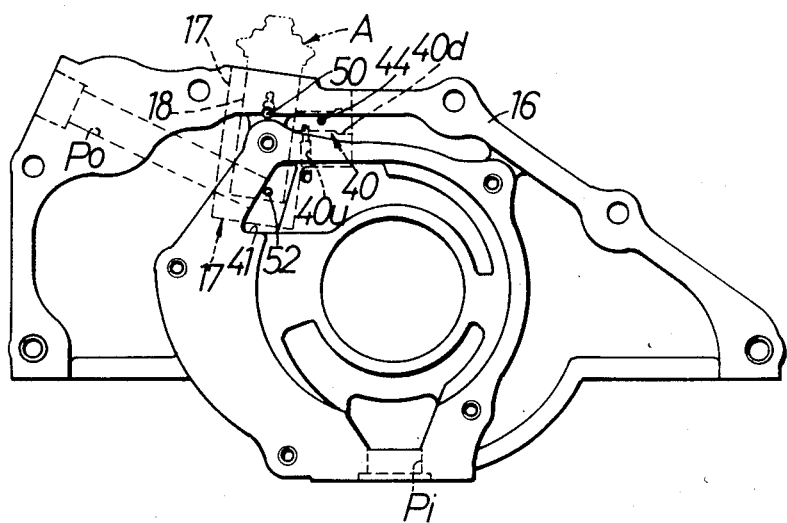

A well known hydraulic pump P for forcibly supplying lubricant or the like to parts to be lubricated of the engine body E is secured to the end wall 13 of the engine body E, the hydraulic pump P being directly coupled to and driven by the crank shaft 1. Oil stored within the engine body E is taken into an intake passage Pi (FIG. 4) and discharged into an outlet passage Po.

An adjuster case 17 for the hydraulic automatic adjuster A is cast and molded integral with the outer surface of the pump case 16 for the hydraulic pump P.

Next, the construction of the hydraulic automatic adjuster A will be described principally with reference to FIGS. 5 and 6. The adjuster case 17 for the automatic adjuster A is formed integral with the upper portion of the outer surface of the pump 16. The adjuster case 17 is formed with a cylindrical housing 19 provided with a cylinder bore 18 having an open end 18a. A hollow cylindrical plunger case 21 likewise having an open upper end 20 is fitted into the cylinder bore 18, and an O-ring 22 is interposed between the upper outer circumference of the plunger case 21 and the inner circumferential surface of the open end 18a of the cylinder bore 18. This O-ring 22 serves to oil-tightly seal between the cylinder bore 19 and the plunger case 21 from the outside.

A plunger 23 is slidably fitted movably up and down within the plunger case 21. A seal member is not provided between the sliding surfaces but a sliding clearance C is formed therebetween. A plug 25 is fitited to an open upper end 24 of the plunger 23. A cap 27 as a slipper member is fitted into a depression 26 as an oil injection port through an O-ring 29, the cap 27 being formed at the top with a connecting surface or a slipper surface 28, against which abuts a lower end of an adjusting screw 30 adjustably threaded into the foremost end of the oscillating lever 9. The slipper surface 28 is subjected to thermal hardening process. Below the plunger 23 is formed a high pressure oil chamber 31 by a bottom wall 23d thereof and the plunger case 21, and an extra oil chamber 32 is formed within the plunger 23.

A valve port 33 is opened to the bottom wall 23d of the plunger 23, and the high pressure oil chamber 31 and the extra oil chamber 32 are brought into communication with each other through the valve port 33. The high pressure oil chamber 31 encases therein a check valve V for opening and closing the valve port 33 and a tension spring 34 for upwardly biasing the plunger 23, the check valve V comprising a spherical valve body 35 seated on a seat of the valve port 33, a valve case 36 for encasing the valve body 35 and a valve spring 37 for urging the valve body 35 in a closing direction.

At a level lower than the O-ring 22, an oil port 38 extends through a sidewall 21s of the plunger case 21, the oil port 38 being normally brought into communication with the extra oil chamber 32 through an oil port 39 bored in a side wall 23s of the plunger 23. The feed oil port 38 is brought into communication with a feed oil passage 40 bored in the adjuster case 17.

The feed oil passage 40 is brought into comunication with an outlet 41 (FIG. 6) of the hydraulic pump P. Thus, if the hydraulic pump P connected to the crank shaft 1 is driven as the engine operates, pressure oil therefrom is always forcibly supplied to the extra oil chamber 32 through the outlet 41, the feed oil passage 40, the feed oil port 38 and the oil port 39.

Figure 6:
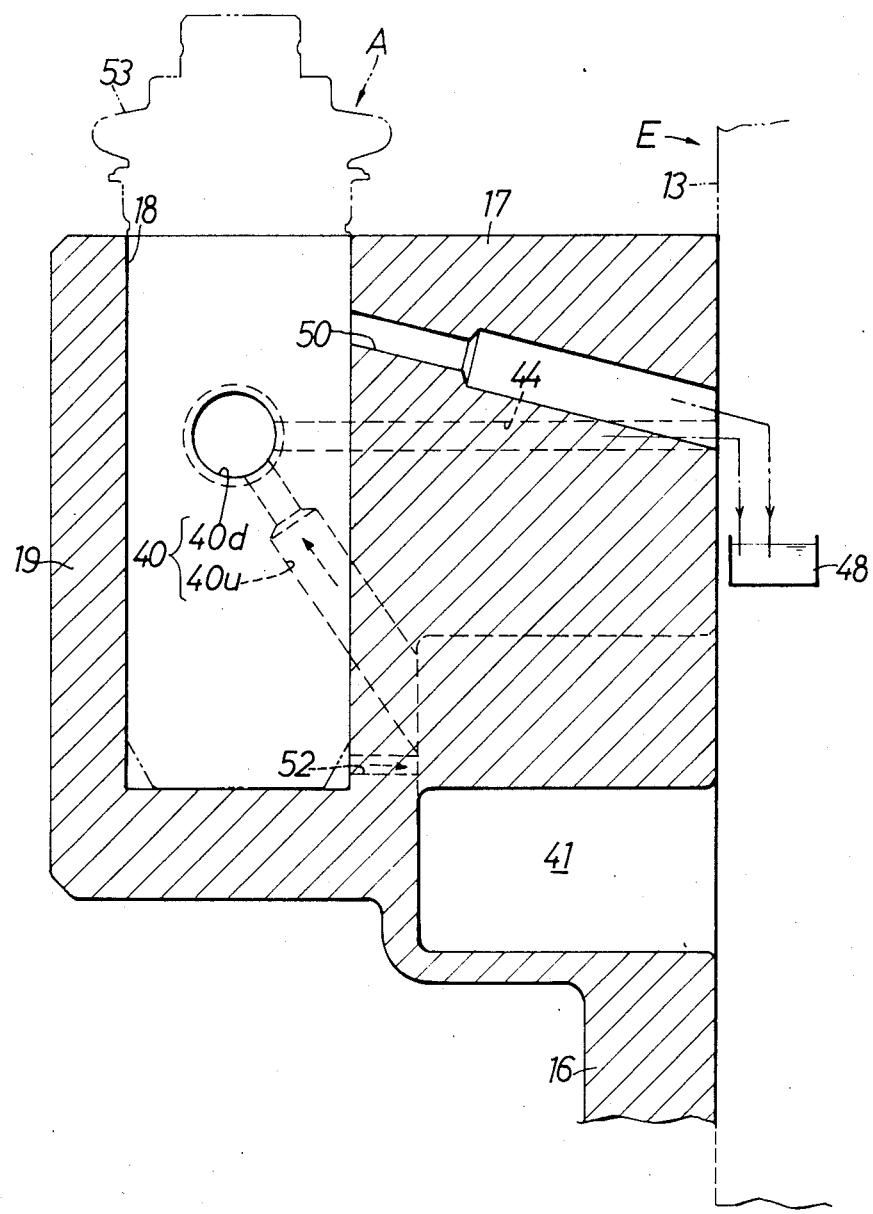

As may be clearly shown in FIG. 6, the feed oil passage 40 comprises a downstream passage 40d on the side of the extra oil chamber 32 and an upstream passage 40u on the side of the hydraulic pump P, the downstream passage 40d having its open end closed by the plug 42. The downstream feed oil passage 40d encases therein a pressure regulator R. The regulator R comprises a piston 46 for opening and closing an oil reservoir communicating port 44 slidably fitted into the downstream passage 40d and a spring 47 for urging the piston 46 toward the closed side, whereby when oil pressure within the passage 40 exceeds a predetermined value, the piston 46 is caused to slide in an opening direction against the force of the spring 47 to communicate the oil reservoir communicating port 44 with the feed oil passage 40 thus returning the pressure oil within the feed oil passage 40 to an oil reservoir 48 at the lower portion of the engine body E.

Between the O-ring 22 and the feed oil port 38, an oil discharge port 49 is bored in the side wall 21s of the plunger case 21. This oil discharge port 49 communicates an annular chamber 51 as a leak oil chamber, which is formed between the plunger case 21 and the plunger 23, with an oil discharge passage 50 formed in the housing 19 and opening to the cylinder bore 18, the passage 50 being brought into communication with an oil reservoir 48 (FIG. 6) within the engine body E.

A leak passage 56 is formed between fitting surfaces of the open upper end 24, which is reduced in diameter to be smaller than the lower portion of the plunger 23, and the plug 25. The extra oil chamber 32 is brought into communication with the annular chamber 51 through the leak passage 56 whereby oil within the extra oil chamber 32 flows with cut-in air into the annular chamber 51 through the leak passage 56 and is further circulated from the annular chamber 51 into the oil reservoir 48 within the engine body E through the discharge port 49 and the discharge passage 50.

Figure 5:
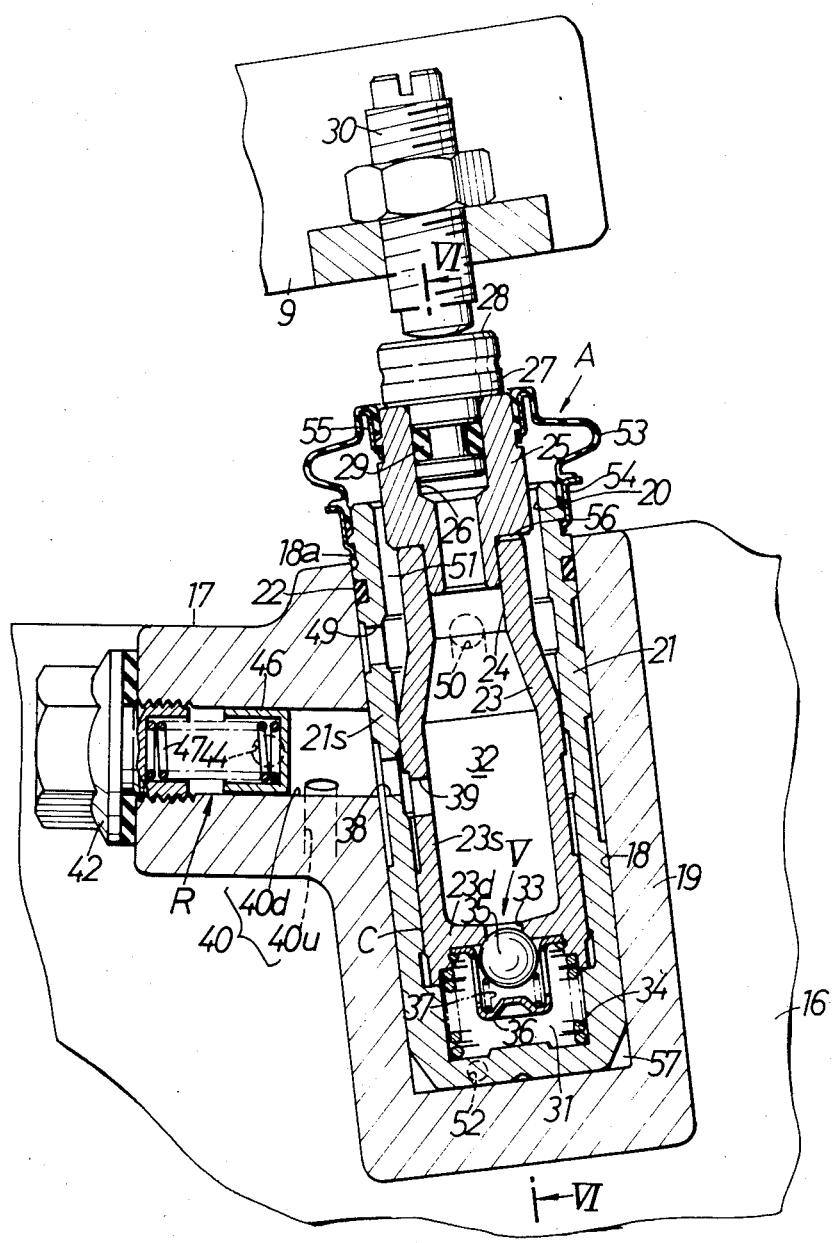

As shown in FIG. 5, the housing 19 is formed at the bottom with an air extraction passage 52 for communicating the lower portion of the high pressure oil chamber 31 with the outlet 41 of the oil pump P, the air extraction passage 52 being provided to remove air sealed into an air chamber 57 formed in the bottom of the cylinder bore 18 when the plunger case 21 is incorporated into the cylinder bore 18.

A lower end edge of a flexible boot 53 formed of rubber, synthetic resin or the like is oil-tightly fastened by means of a fastening member 54 on the outer circumferential surface at the upper end of the plunger case 21 whereas an upper end edge of the boot 53 is reversed and fastened oil-tightly to the outer circumference of the plug 25 by means of the other fastening member 55. This boot 53 expands so as to follow upward and downward movement of the plunger 23 to oil-tightly seal between the plunger case 21 and the plug 25, that is, a clearance in communication with the outside of the plunger 23, preventing oil within the annular chamber 51 from leaking outside.

The operation of the embodiment according to the present invention will be described hereinafter.

When the engine is now operated, rotation of the crank shaft 1 is transmitted to the pair of valve-operating cam shafts 2 through the timing wrapping connector driving device T which comprises the driving pulley 3, the transmission belt 5 and the driven pulleys 4.

The tension pulley 8 disposed on the loosening side $5_1$ of the transmission belt 5 is pressed against the belt 5 by the automatic adjuster A and is automatically actuated in response to variation in tension force of the transmission belt 5 on the loosening side $5_1$ to apply a given tension force to the transmission belt 5.

The operation of the automatic adjuster A will be further described in detail.

Figure 7:
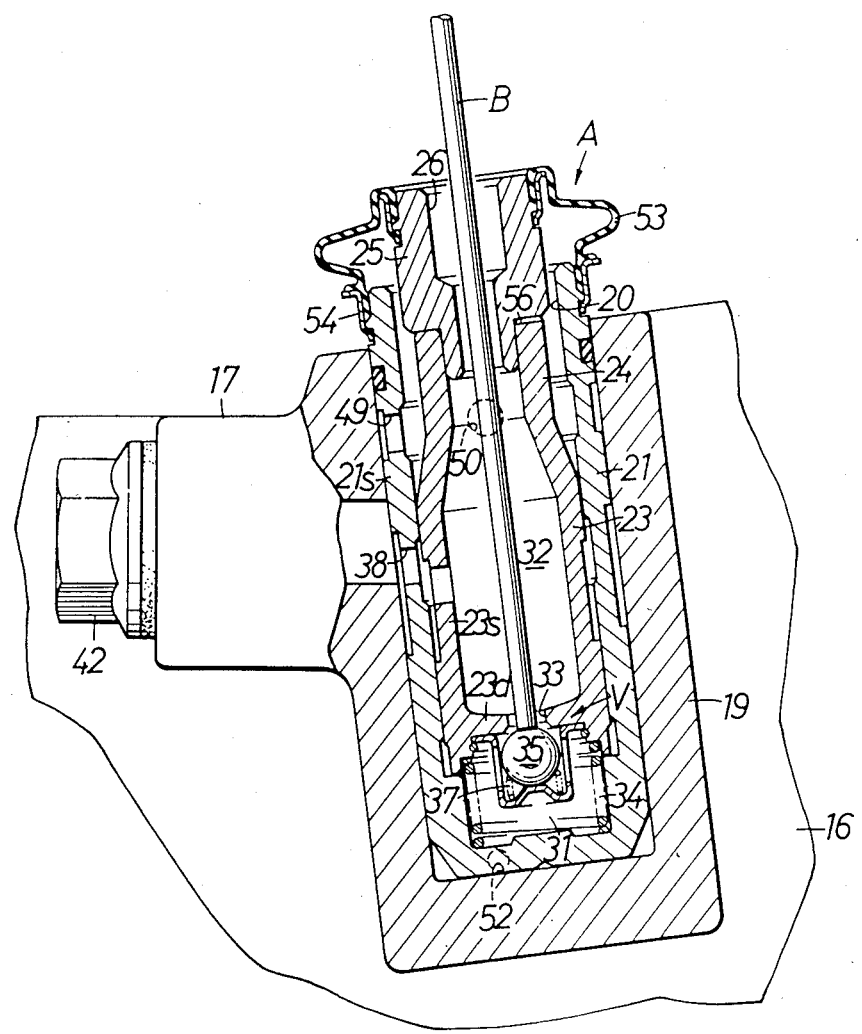

The same oil as lubricating oil for the engine is injected beforehand into the high pressure oil chamber 31 within the plunger case 21. In this case, as shown in FIG. 7, when the cap 27 is removed from the plug 25, the oil injection port 26 is open to outside and therefore if a push rod B is inserted into the extra oil chamber 32 within the plunger 23 from the oil injection port 26 to press down the spherical valve body 35, the valve port 33 opens so that oil can be injected and filled into the high pressure oil chamber 31 while the plunger 23 is incorporated.

When the luricating hydraulic pump P is driven by the operation of the engine E, a part of pressure oil therefrom is always forcibly supplied into the extra oil chamber 32 through the outlet 41, the feed oil passage 40, the feed oil port 38 and the oil port 39 whereby the extra oil chamber 32 is filled with oil. The oil within the extra oil chamber 32 passes through the leak passage 56 with cutin air sealed within the chamber 32 and reach the closed annular chamber 51, and thence the oil is circulated into the oil reservoir 48 at the lower portion of the engine body E through the oil discharge port 49 and the oil discharge passage 50. Accordingly, the oil flowing between the hydraulic pump P, the automatic adjuster A and the oil reservoir 48 never leaks outside the engine body E but lubricating oil is constanly supplied to the extra oil chamber 32 for the automatic adjuster A during the operation of the engine.

When oil pressure within the feed oil passage 40 exceeds a predetermined value, the piston 46 of the regulator R is moved backward against the force of the spring 47 to provide for communication between the oil reservoir communicating port 44 and the feed oil passage 40 to short-circuit the passage 40 relative to the oil reservoir 48, thus maintaining the oil pressure within the passage 40 constant.

In the automatic adjuster A, the tension spring 34 within the high pressure oil chamber 31 upwardly urges the plunger 23 by the aid of the force thereof to turn the oscillating lever 9 counterclockwise as viewed in FIG. 1 through the connecting surface 28 formed from a hardening layer of the cap 27 and the adjusting screw 30 whereby the tension pulley 8 inwardly presses the transmission belt 5 on the loosening side $5_1$ to apply a given tension force to the transmission belt 5. In addition, since the force of the tension spring 14 acts on the oscillating lever 9 to turn the latter counterclockwise in FIG. 1, the application of tension to the transmission belt 5 is assisted thereby.

When the plunger 2 is moved upward following the expansion of the transmission belt 5 and the like, the high pressure oil chamber 31 is reduced in pressure, and therefore the spherical valve body 35 of the check valve V causes the valve port 33 to open due to a pressure differential between the high pressure oil chamber 31 and the extra oil chamber 32, and the oil within the extra oil chamber 32 is supplied to the high pressure oil chamber 31 through the valve port 33.

During the operation of the timing wrapping connector driving device, when tension force exerts on the transmission belt 5 on the loosening side $5_1$ due to variation in torque acting on the crank shaft 1, the valve-operating cam shafts 2 and the like, the tension functions so as to push back the tension pulley 8 and further functions so as to push down the plunger 23 through the oscillating lever 9. Thereby, the oil pressure in the high pressure oil chamber 31 rises and the valve port 33 is closed by the spherical valve body 35 of the check valve V to prevent a back-flow of oil to the extra oil chamber 32. After all, oil pressure in the high pressure oil chamber 31 confronts with the tension force of the transmission belt 5 on the loosening side $5_1$ to restrain the backward movement of the tension pulley 8.

Due to the presence of a sliding clearance between the plunger case 21 and the plunger 23 and containment of a little amount of bubbles within oil in the high pressure oil chamber 31, the plunger 23 is actually slightly depressed whereby the tension shock acting on the transmission belt 5 on the loosening side $5_1$ may be relieved.

When the tension is released from the transmission belt 5 on the loosening side $5_1$, the plunger 23 is again moved upward by the resilient force of the tension spring 34, and the tension pulley 8 presses the transmission belt 5 on the loosening side $5_1$ through the oscillating lever 9 to again apply a given tension force to the transmission belt 5. In this case, if an elongation is present in the transmission belt 5, it can be compensated for. Oil in the extra oil chamber 32 is supplied into the high pressure oil chamber 31 reduced in pressure by upward movement of the plunger 23, as previously mentioned.

More specifically, where during the operation of the auotmatic adjuster A, excessively great tension force exerts on the transmission belt 5 due to contraction of the transmission belt 5 resulting from variation in temperature in the periphery of the engine body E or the like and an increase in distance between rotational shafts of the driving and driven pulleys 3 and 4 resulting from thermal expansion of the engine body, and tension shock exerts on the transmission belt 5 for some cause, the plunger 23 of the automatic adjuster A is depressed slightly and the aforesaid excessively great tension and the tension shock may be effectively absorbed by the following action and the excessively large load imposed on the transmission belt 5 may be reduced. That is, a sliding clearance C is positively formed between the adjuster case 21 and the plunger 23 slidably fitted therein whereby when an excessively great pressing-in load acts on the plunger 23, high pressure oil within the high pressure oil chamber 31 leaks toward the extra oil chamber 32 through the sliding clearance C, as a consequence of which the plunger 23 is slightly depressed to thereby absorb surplus tension force and tension shock applied to the transmission belt 5.

When the plunger 23 is extended, the pressure oil in the extra oil chamber 32 is immediately supplied into the high pressure oil chamber 31 as described above to maintain the high pressure oil chamber 31 at a predetermined high pressure level, and the automatic adjuster A is very good in responsiveness to the extension of the transmission belt 5 despite the presence of the absorbing action of the aforesaid excessively large load to always maintain the tension of the transmission belt constant.

In the aforementioned operation, the pressure oil from the hydraulic pump P is always supplied into the extra oil chamber 32 as mentioned above, and therefore, a slight leakage of oil in the extra oil chamber 32, if any, can be immediately compensated for. In addition, since oil is always supplied into the extra oil chamber 32, discharge of cut-in air into the chamber 32 may be easily accomplished and automatic adjustment of a tension degree of the transmission belt may be precisely performed as a whole.

Moreover, the pressure oil does not leak outside from the adjuster case 17 by cooperation between the O-ring 22 and the expansive boot 53 despite the fact that pressure oil from the hydraulic pump P is always supplied into the extra oil chamber 32, and further, since the seal member for oil-tightly sealing the adjuster case 17 from the outside is not provided between the sliding surfaces of the plunger case 21 and the plunger 23, they will not increase the sliding resistance of the plunger 23 and will not be worn out.

Figure 8:
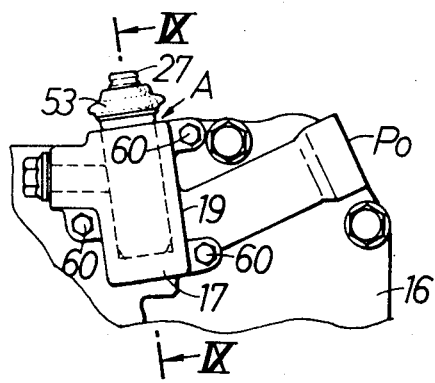
FIGS. 8 and 9 show a second embodiment of the present invention.
Figure 9:
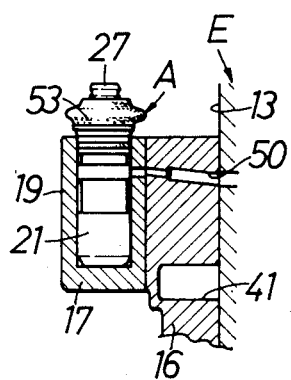

A second embodiment according to the present invention is shown in FIGS. 7 and 8.

In this second embodiment, the pump case 16 and the adjuster case 17 are separately formed, and the adjuster case 17 is directly secured to the outer end surface of the pump case 16 by means of a plurality of bolts 60.

In the second embodiment, the maintenance of the automatic adjuster A becomes easy, and a freedom of mounting the automatic adjuster A to the pump case 16 increases to facilitate a layout thereof.

Other constructions of the second embodiment are the same as those of the first embodiment.

While in the aforementioned embodiment, the case where the present invention is applied to the belt type wrapping connector driving device has been described, it is to be noted of course that the invention may be also carried for other wrapping connector driving devices of the chain type or the like.

What is claimed is:

1. A tensioner device for a wrapping connector driving device in an internal combustion engine in which an endless transmission belt is extended between a driving wheel and a driven wheel supported on an engine body, and a tensioner is pressed against the transmission belt on a loosening side thereof to apply a predetermined tension force to the transmission belt, wherein said tensioner device has a hydraulic automatic adjuster comprising a plunger case provided on the engine body, a plunger slidably fitted in said plunger case and connected to the tensioner, a high pressure oil chamber defined below said plunger, an extra feed oil chamber provided internally of said plunger and communicated with said high pressure oil chamber through a valve port bored in a bottom wall of said plunger, a check valve encased in said high pressure oil chamber to close said valve port when pressure in said high pressure oil chamber increases and to open the valve port when pressure in said high pressure oil chamber decreases, and a tension spring encased in said high pressure oil chamber to bias said plunger in an extending direction to apply a predetermined tension force to said transmission belt on the loosening side thereof via the tensioner, wherein said plunger case is bored with a feed oil port and an oil discharge port in a spaced relation, said feed oil port being communicated with said extra oil chamber, said oil discharge port being communicated with an upper portion of said extra oil chamber through a leak oil chamber formed between said plunger case and said plunger, an outer open end between said plunger case and said plunger being sealed by means of a flexible boot.

2. A tensioner device as set forth in claim 1, wherein said plunger is formed into a cylindrical configuration with an upper end thereof opened, and said flexible boot has one end edge oil-tightly affixed to a plug fitted into the open upper end of said plunger and another end edge oil-tightly affixed to an upper end of said plunger case.

3. A tensioner device as set forth in claim 2, wherein said extra oil chamber and said leak oil chamber are placed in communication through a leak passage formed between fitting surfaces of said plunger and said plug.

4. A tensioner device as set forth in claim 1, 2 or 3, wherein said plunger case is formed at equal diameter over a full length thereof, said plunger has a reduced diameter portion in an upper portion thereof, and said leak oil chamber is defined between an inner circumferential surface of said plunger case and an outer circumferential surface of the reduced diameter portion of said plunger.

5. A tensioner device for a wrapping connector driving device in an internal combustion engine in which an endless transmission belt is extended between a driving wheel and a driven wheel supported on an engine body, and a tensioner is pressed against the transmission belt on a loosening side thereof to apply a predetermined tension force to the transmission belt, wherein said tensioner device has a hydraulic automatic adjuster comprising a plunger case provided on the engine body, a plunger slidably fitted in said plunger case, a high pressure oil chamber defined below said plunger, an extra feed oil chamber provided internally of said plunger to communicate with said high pressure oil chamber through a valve port bored in a bottom wall of said plunger, a check valve encased in said high pressure oil chamber to close said valve port when pressure in said high pressure oil chamber increases and to open said valve port when pressure in said high pressure oil chamber decreases, and a tension spring encased in said high pressure oil chamber to bias said plunger in an extending direction to apply a predetermined tension force to said transmission belt on the loosening side thereof, wherein said extra oil chamber is brought into communication with a feed oil source through a feed oil port, said plunger having an oil injection port opened to an upper end thereof for communicating said extra oil chamber with outside, said oil injection port being oil-tightly fitted with a cap which is operatively connected to said tensioner.

6. A tensioner device as set forth in claim 5, wherein said oil injection port is formed in a plug fitted into an open portion at an upper end of said plunger.

7. A tensioner device as set forth in claim 5 or 6, wherein said cap is provided at a top thereof with a connecting surface placed in operative connection with said tensioner, said connecting surface being subjected to thermal hardening process.

8. A tensioner device as set forth in claim 5, wherein when said cap is dismounted from said plunger, said check valve is made accessible from outside through said oil injection port by means of a rod member.

9. A tensioner device for a wrapping connection driving device in an internal combustion engine in which an endless transmission belt is extended between a driving wheel and a driven wheel supported on an engine body, and a tensioner is pressed against the transmission belt on a loosening side therof to apply a predetermined tension force to the transmission belt, wherein said tensioner device has a hydraulic automatic adjuster comprising a cylinder bore formed in a casing provided on said engine body, a plunger case fitted in said cylinder bore, a plunger slidably fitted in said plunger case, a high pressure oil chamber defined below the plunger, an extra feed oil chamber provided within said plunger to communicate with said high pressure oil chamber through a valve port bored in a bottom wall of said plunger, a check valve encased in said high pressure oil chamber to close said valve port when pressure in said high pressure oil chamber increases and to open the valve port when pressure in said oil chamber decreases, and a tension spring encased in said high pressure oil chamber to bias said plunger in an extending direction to apply a predetermined tension force to said transmission belt on the loosening side thereof through said tensioner, wherein said extra oil chamber is communicated via a feed oil port and an oil discharge port with a feed oil source and an oil reservoir, respectively, through respective closed oil paths, a seal member being provided to oil-tightly seal between an open end of said cylinder bore and said plunger case, and a flexible boot being provided to oil-tightly seal between an open end of said plunger case and an outer end of said plunger.

10. A tensioner device as set forth in claim 9, wherein said plunger case is formed into a cylindrical configuration having an axis, and said feed oil port and said oil discharge port are bored in said plunger case in a manner such that the ports are located inwardly of said seal member at a spacing from each other in an axial direction of said plunger case.

11. A tensioner device as set forth in claim 10, wherein said feed oil port is positioned inwardly of said oil discharge port, and said plunger is provided with an oil port for bringing said feed oil port into communication with said extra oil chamber and a leak passage for bringing said oil discharge port into communication with said extra oil chamber in such a manner that said oil port and said leak passage are spaced in an axial direction from each other.

12. A tensiner device for a wrapping connector driving device in an internal combustion engine in which an endless transmission belt is extended between a driving wheel and a driven wheel supported on an engine body, and a tensioner is pressed against the transmission belt on a loosening side thereof to apply a predetermined tension force to the transmission belt, wherein said tensioner device has a hydraulic automatic adjuster comprising a plunger case provided on the engine body, a plunger slidably fitted in said plunger case and connected to said tensioner, a high pressure oil chamber defined below said plunger, an extra feed oil chamber formed within said plunger, a check valve encased in said high pressure oil chamber and capable of allowing flow of pressure oil only in a direction from said extra oil chamber to said high pressure oil chamber, and a tension spring encased in said high pressure oil chamber to bias said plunger in an extending direction to press said tensioner against said transmission belt, wherein a sliding clearance is formed between sliding surfaces of siad plunger case and said plunger for allowing leakage of high pressure oil within said high pressure oil chamber into said extra oil chamber, and said plunger is formed with a feed oil port leading to a pressure oil source and an oil discharge port leading to an oil reservoir.

13. A tensioner device as set forth in claim 12, wherein said feed oil port is provided at a position closer than said oil discharge port relative to said sliding clearance.

* * * * *